United States Patent [19]

Lee

[11] Patent Number: 4,723,192
[45] Date of Patent: Feb. 2, 1988

[54] AUTOMATIC ELECTRICITY CONTROL MONITORING EXIT/ENTRY DEVICE

[76] Inventor: Jiunn K. Lee, No. 27, Alley 13, Lane 512, Min-Tsu E. Road, Taipei, Taiwan

[21] Appl. No.: 751,970

[22] Filed: Jul. 5, 1985

[51] Int. Cl.⁴ .......................................... H01H 47/24
[52] U.S. Cl. .................................................. 361/175
[58] Field of Search ............... 361/173, 175, 176, 177, 361/170, 179; 340/573, 600

[56] References Cited

U.S. PATENT DOCUMENTS 3,704,396 11/1972 McDonald .......................... 361/175
4,346,427 8/1982 Blissett et al. ................... 361/175 X Primary Examiner—Michael L. Gellner
Attorney, Agent, or Firm—Clifford A. Poff; Thomas H. Murray

[57] ABSTRACT

A device turns ON and OFF electrical power in a building in response to entry and exit of people. Four sets of infra red light emitters and receivers supply receiver signals to entry and exit monitor circuits having integrated circuits connected together to deliver down pulses by discrimination between the occurrence of infrared receiver signals. The count pulses are delivered to a counting circuit which is preset by a manually operated switch which supplies a preset signal to a comparator circuits which also receives the signal from the counting circuit to produce an ON-OFF signal. A controller circuit receives this ON-OFF signal and controls the electrical power in an electricity supply line.

10 Claims, 3 Drawing Figures

AUTOMATIC ELECTRICITY CONTROL MONITORING EXIT/ENTRY DEVICE

BACKGROUND OF THE INVENTION

Many kinds of automatic electricity monitoring devices can be found in the market. Each of these devices possesses its own advantages, defects, and characteristics. The most popular devices of these kinds include those for voltage control, temperature control and light interruption control. Though their uses differ from each other, most of them are used for machinery in factories or in public space. However, none of them is used in families. Therefore, even though living standards have been raised to a high level, and lots of electrical appliances have been developed, still inventors are urged to solve many problems. For instance, forgetting to turn off switches for lamps, television sets, hair blowers, or other electrical applicances when people go out for work or on a trip, frequently causes a waste of money and energy because the electricity is left on to be continuously consumed; it can be much worse when the electricity source left on can become overloaded and cause shortcircuits or, and even fire.

The present inventor has focused on the problem, and after careful research and experiments, finally invented this safe and convenient automatic electricity control monitoring exit/entry device, characterized in that it consists of four sets of infra-red light emitter and receiver, thus constituting a discrimination system to monitor and check the exit or entry of people. With the help of a manually operated switch to preset the initial data of a counter circuit, the discriminator provides pulse signal to make comparisons with preset points for checkout counting between exit and entry, which uses a drive electricity control switch circuit to automatically control the off and on of the electricity load, and consequently saves unnecessary electricity consumption when the switches of the power source have not been burned off; meanwhile it provides convenience, increases electricity safety, and avoids overloading shortcircuits and wire ignition to prolonged period of consumption.

SUMMARY OF THE INVENTION

The main objective of this invention is to provide a dependable and automatic electricity control monitoring exit/entry device, characterized in that it can automatically cut off the unnecessary consumption of electric sources inside the house, so as to safeguard the safety in use of electricity, and to facilitate the use of and saving of electricity.

Another objective of this invention is to provide an automatic, or a manual control, automatic electricity control monitoring exit/entry device, of which the number counted for exit and entry of people can reach 99.

With the illustration of the attached drawings, the objects, characteristics and concrete structure of this invention are defined below.

DETAILED DESCRIPTION OF THE INVENTION

Figure 1:
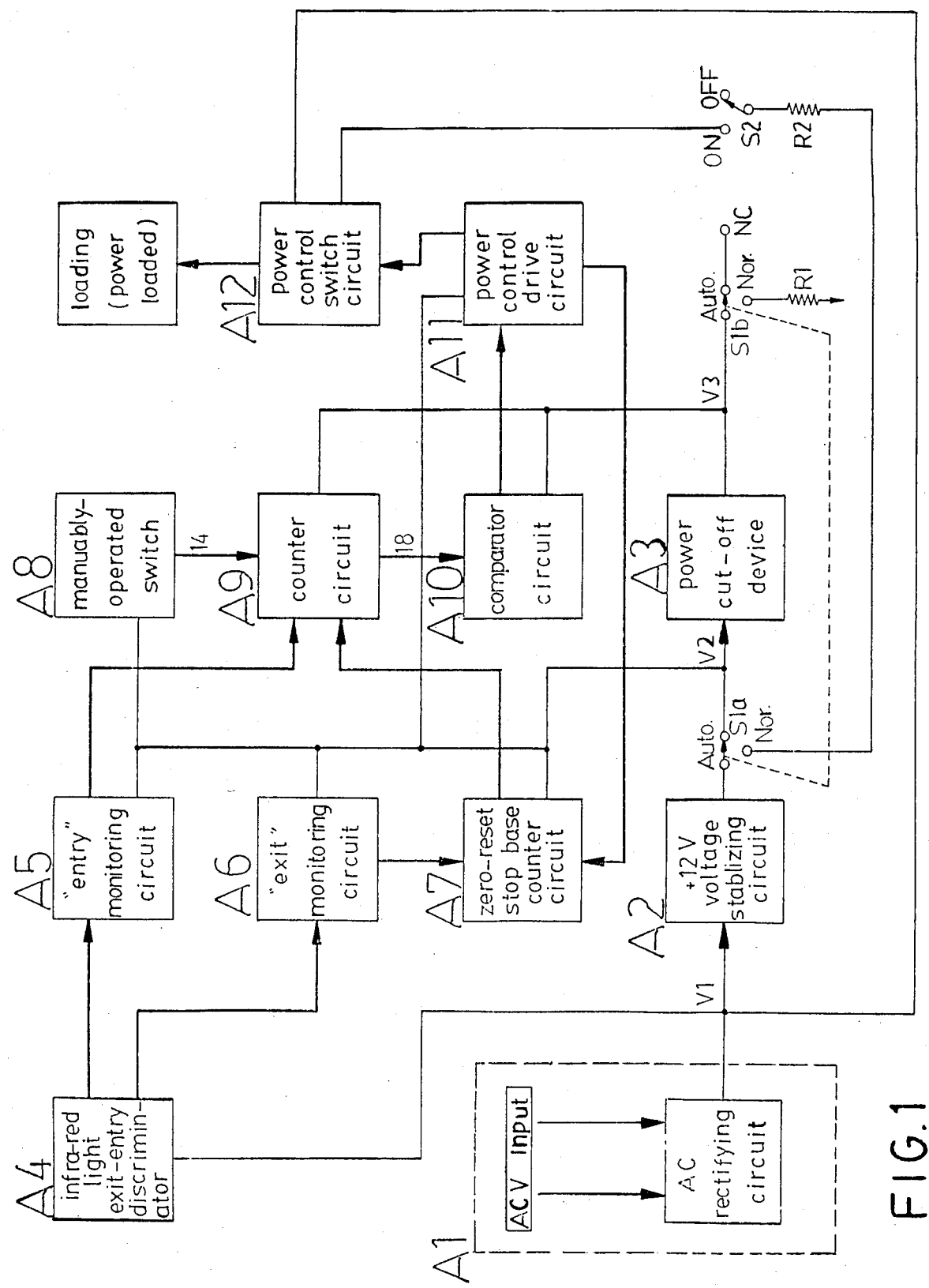
FIG. 1 is a square rectification chart of this invention.

Referring to the drawings, the circuits of this invention comprise an AC rectifying circuit A1, a +12 V voltage stablizing circuit A2, a power-off device A3, an infra-red light exitentry discriminator A4, an entry monitoring circuit A5, an exit monitoring circuit A6, a zero-reset stop base counter circuit A7, a manually operated switch circuit A8, a counter circuit A9, a comparator circuit A10, an electricity control drive circuit A11, and an electricity control switch circuit A12, in which, AC rectifying circuit A1 has a total of three sets of voltage systems V1, V2 and V3. After rectifying by a tranformer, the AC current is turned into DC current V1, and the approximate voltage vlaue is +17V; through the voltage stablizing triode IC of voltage stablizing circuit A2, voltage V1 will be converted and stabilized into voltage V2, its voltage value being about +12V, the voltage of V3 being supplied by power-off device circuit A3. Shown in FIG. 1, when electricity blackout occurs, voltage V3 will continue to supply the electricity required by counter circuit A9 and comparator circuit A10, thus leaving the data within counter circuit A9 unchanged. Entry monitor circuit A5 and exit monitor circuit A6 respectively receive output signals from infra-red light exit/entry discriminator A4 and form two movement circulation system. Manually operated switch A8 is a decimal system device, which presets the counting data of counter circuit A9 at its initial state; in other words, it can be preset from 0 to 9 decimal numerals, origin of the comparative vlaues of comparator circuit A10 can be classified into 2 categories: one is the value counted by counter circuit A9, one is the preset zero value; therefore, when the counted value of counter circuit A9 equals zero, comparator circuit A10 will send signal Hi to electricity control drive circuit A11 to turn off electricity control switch circuit A12, and cut the electricity source it loads; at the same time, electricity control drive circuit A11 will also send signal LO to the zero reset stop base counter circuit A17, to lockup this circuit, thus making counter circuit A9 stop any calculations for numerals below zero.

The two monitor situations here regarding the action and principle of "Entry" and "Exit" are follows:

1. The principle for monitoring "Entry"

When someone enters, the infra-red light exit/entry discriminator A4 detects it and sends the detected signals in order into the "Entry" monitor circuit A5 and "Exit" monitor circuit A6: First, manually-operated switch A8 presets the value of the counter as zero; when one enters, "Entry" monitor circuit A5 will transmit a pulse signal to counter circuit A9 (meanwhile, "Exit" monitor circuit A6 will not transmit any signals) and the counting digit is therefore added as "1". Then the output signal of comparator circuit A10 will drop from Hi to 10, and electric control drive circuit A11 will turn on electricity control switch circuit A12, thus loading it with electricity; when a second one enters, the counter will automatically record another digit "1", adding it to the former "1", hence, the counted value becomes "2", therefore it stll accepts the loading of the electricity supply (only when the counted value is zero, the comparator circuit will output a Hi signal to cut off the supply of electricity loading).

2. The principle for monitoring "Exit".

When one exits, the "exit" monitor circuit A6 will transmit pulse signal (simultaneously), "entry" monitor circuit A5 will not transmit any pulse signal) to zero-reset stop base counter circuit A7; at this point, if the counted data is not "zero", then this circuit will not be locked up. Therefore, a pulse signal will be sent to counter circuit A9, and consequently the data within this counter will substract "1"; after substracting "1" and the counted value still remains beyond zero, then the output of comparator circuit A10 will be LO, and the electricity loading will continue; in cases, after substracting "1", the value on the counter equals zero, then the output signal of comparator circuit A11 will rise from LO to Hi, thus turning on electricity control switch circuit A12 and cutting off the supply of electricity loading.

The counter circuit A9 of this device can count up to 99 persons or numerals for in and out.

Figure 2A:
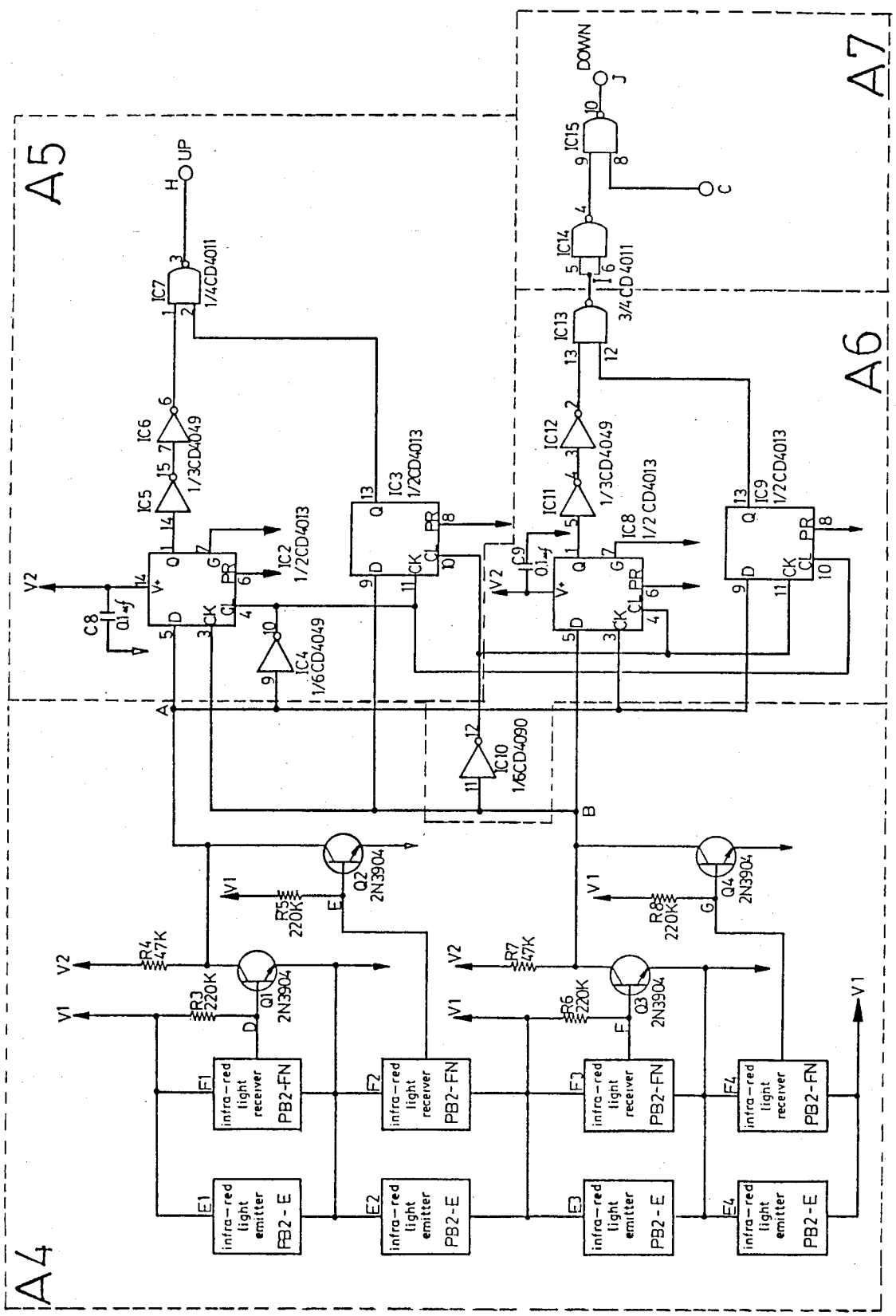
FIG. 2A and 2B are circuit charts of this invention.
Figure 2B:
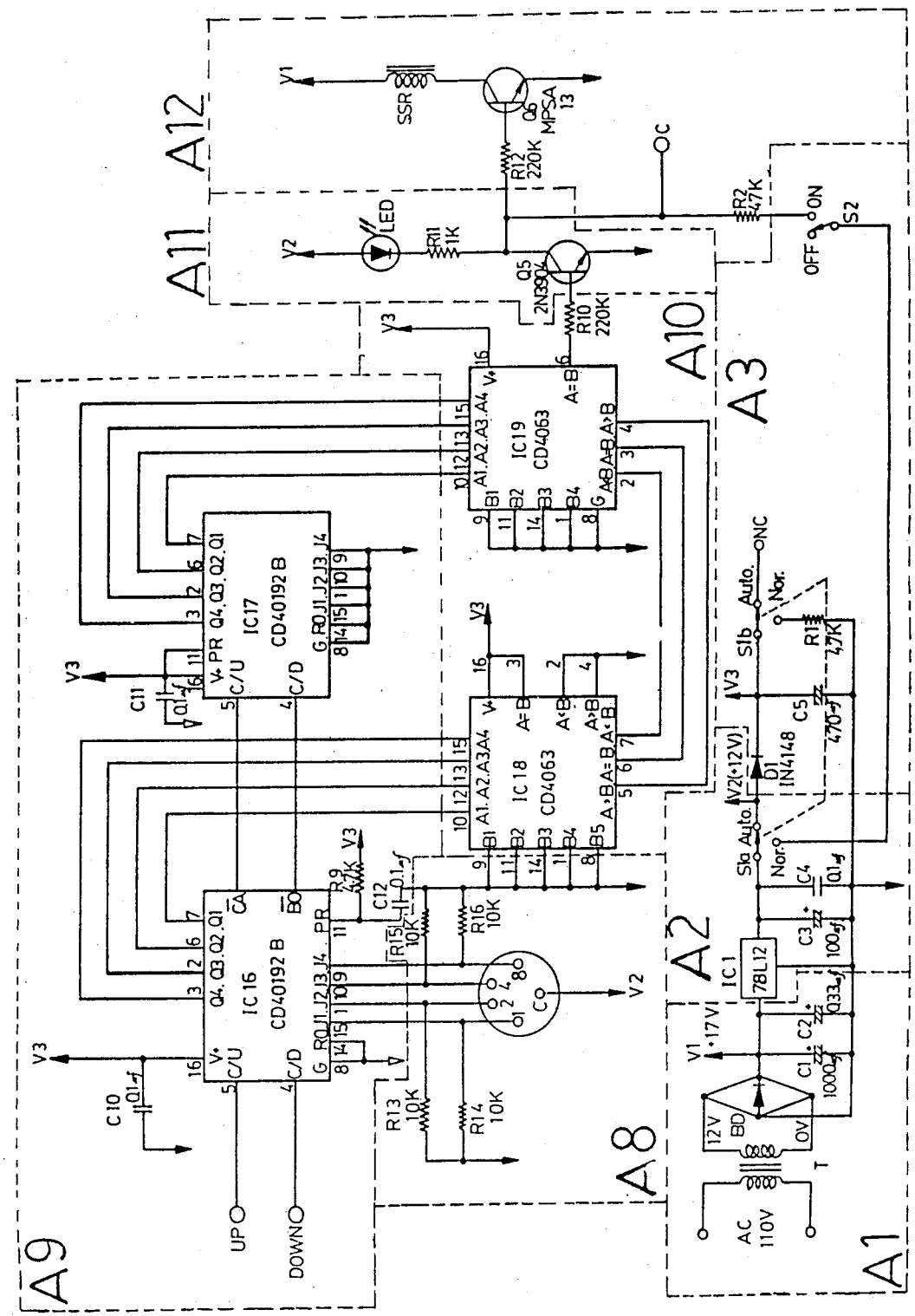

Coinciding with the said monitoring principle of "entry" and "exit", a detailed description of the characteristics and structure of the circuits of this invention is as follows:

Shown in FIG. 2B, AC rectifying circuit A1 rectifies AC 110V voltage through a transformer T into voltage of AC 12V; through bridge rectifier BD and current (pulse) smoothing capacitors C1 and C2, DC voltage V1, approximately +17V, will be obtained after the process of rectifying and pulse smoothing, so as to supply the required voltage (see FIG. 1) for the infra-red light exit/entry discriminator A4 and electricity control switch circuit A12.

+12V voltage stabilizing circuit A2 uses triode voltage stablizing IC1 (78 L12) to convert the abovementioned voltage V1 into +12V stablizing voltage V2, thus supplying required electric source and voltage for "entry" and "exit" monitoring circuits A5 and A6, manually operated switch A8, zero-reset stop base counter circuit A7 and electricity control drive circuit A11. (see FIG. 1).

Capacitor C4 helps to smooth away the high frequency noise and capacity C3 can help stablize voltage V2.

Power off device A3 consists of diode D1 and capacitor C5. when the power supply is normal, voltage V2 passes through D1 and loads C5 with electricity. At this point, voltage V2 is converted into voltage V3, which supplies the required power source and voltage (see FIG. 1) for counter circuit A9 and comparator circuit A10. When a power blackout occurs, the voltage of V2 is at zero. Owing to the loading from C5, voltage V3 is greater than V2, hence, the power at D1 is reversed which cause offset and cut of voltage. As a result, voltage V3 at C5 will not diminish by passing through D1. Owing to V3 continues to supply the necessary power to counter circuit A9 and comparator circuit A10, the data within the counter remains stable. When the electricity returns to normal, the digits counted on the counter before and after power blackout are observed to be the same. Resistor R1 is responsible for discharge (when switch S1b is set at Normal) for voltage V3 of the blackout (power-off) device. Because the electricity consumption of counter circuit A9 and comparative circuit A10 of this invention is very low (using CMOS IC), the voltage supply of V3 can last for a fairly long time. Shown in FIG. 2A, the circuit of infra-red light entry/exit discriminator A4 comprises four sets of infra-red light emitter (#PB2-E) and receiver (#PB2-FN), transistors Q1–Q4, and resistors R3–R8. In the process of design and assembly, the infra-red light emitters and receivers must be positioned accurately at the right location. When the receivers receive signals from the emitters, a high voltage level will be formed at ends (D.E.F.G.) of the four sets of infra-red light receiver. As a result, the electricity is conducted through transistors Q1–Q4, and points A and B are at Lo level. As mentioned above, when there is no-one passing through discriminator A4, points A and B are both kept at Lo voltage level.

In the infra-red light entry/exit discriminator A4, E1, E2, F1 and F2 represent the entry discriminators, while E3, E4, F3 and F4 represent the exit discriminators; when someone enters or exits, the human body will block part of the infrared light beam from reaching the receivers. Hence, when F1 is bolcked off, the voltage level at emitting end D becomes LO; simultaneously when F1 and F2 are blocked off, voltage level at ends D and E are also LO. Consequently, Q1 and Q2 are cut off from a voltage supply and cease functioning, the voltage at point A will than rise from LO to Hi. For the same reason, when F=G=Hi, the voltage at point B will rise from LO to Hi. Summing up, infra-red light exit/entry discriminator A4 makes use of the changes from Lo to Hi in orders at point A & B to discrimination. The five orders of change from points A and B for the entry and exit of people can be summarized as follows:

I. when someone enters:
(A). A=LO, B=LO, (B). A=Hi, B=LO, (C) A=Hi, B=Hi, (D). A=LO, B=Hi, (E). A=LO, B=LO II. when someone exits:
(A) A=Lo, B=LO, (B). A=LO, B=Hi, (C). A=Hi, B=Hi (D) A=Hi, B=LO, (E). A=LO, B=LO From the above, it is noted that when one enters, the voltage at point A will rise to Hi before it does at point B, and will drop to the LO level before it does at point, conversely, when some one exits, the voltage at point B will rise to a Hi level before point A, and will drop to a LO level before point A. Therefore, by using their different qualities, the discrimation between exit and entry can be achieved. Infra-red light exit/entry discriminator A4 uses two sets of infra-red light emitter and receiver in its circuit to constitute the discriminators between entry and exit. It can therefore prevent false detection. For instance, bodies or objects other than human forms will not be counted in this system.

"Entry" monitor circuit A5 shown in FIG. 2A, contains IC2–IC7. When nobody enters, A=B=Lo, therefore, the ICs and IC4 will be fully discharged, thus converting the voltage at ends Q of IC2 and IC3 to LO (low level). Conversely, the voltage at output end (H) of gate NAND of IC7 is converted to Hi (High level). According to the above five situations, the principle of the action of "entry" monitoring circuit A5 are given as follows:

1. When someone enters, A=Hi and B=LO, the output voltage of IC2 and IC3 are still LO, therefore, H=Hi.

2. When A=Hi and B=Hi, IC2 is triggered, its output voltage of end Q is Hi.

At this point IC3 has still not been triggered, and its output voltage of end Q is still LO, hence, H still remains unchanged as Hi.

3. When A=LO and B=Hi, IC3 is then triggered, and the output voltage of end Q is converted into Hi; at this time, IC2 is discharged (effected by IC4). However, the inventor makes use of IC5 and IC6 for their extension function. In this case, before the voltage output at end Q of IC2 drops from Hi to LO, because the output voltage at end Q of IC3 rises from LO to Hi, it converts the voltage at point H from Hi to LO. In the same way, when the extension period is over, the voltage at point H will rise from LO to Hi, and produce an output pulse, which is a clock signal produced for counting.

4. When A=LO and B=LO, IC2 and IC3 are discharged (owing to IC 4 and IC10). Therefore, their output voltage of Q are LO, and H is kept at HI level; in this way the situation reverts to the previous preparatory state, ready to receive the next signal from infrared light entry/exit discriminator A4.

5. When someone exits, because the voltage at point B rises to Hi level before it does at point A and drop to LO before before it does at point A, the output of Q of IC2 and IC3 remain unchanged at LO, and its voltage at point H also remains at Hi level. In this way, no pulse is transmitted and the ocunter will not make any error in counting by adding another "1".

As shown in FIG. 2A, "exit" monitor circuit A6 is composed of IC8–IC13. When nobody exits, A=B=LO, and the output of ends Q of IC8 and IC9 are LO. Therefore, output I of IC13 is Hi. This is similar to the principle of "entry" monitor circuit A5, therefore its principles can be summarized as the following six types of situation:

1. When one exits, A=LO, B=Hi, and the voltage at the output end Q of IC8 and IC9 is LO. Hence, I=Hi unchanged.

2. When A=Hi, B=Hi, then the voltage output end Q of IC8 is Hi, and the voltage output end Q of IC9 is LO. Therefore I=Hi unchanged.

3. When A=Hi, B=Lo, the voltage of output end Q of IC9 is Hi. Thus the voltage of I drops from Hi to LO; for the same reason IC11 and IC12 are used for the extension function. When the extension time is over, end Q of IC8 will transmit a LO signal to input end PIN13 of IC13, following which the voltage of I will rise from LO to Hi by this means another pulse signal will be produced. After receiving this pulse signal, the counter is ordered to subtract value "1".

4. When A=LO and B=LO, the voltage of end Q of IC8 and IC9 is LO, it will then revert to its initial state to be ready for the next situation.

5. If someone enters, the voltage level of point A will rise from LO to Hi or drop from Hi to LO before it does at point B. Therefore no action will be taken at IC8 and IC9, which makes output of point I remain at Hi voltage level, to prevent errors from occurring.

From the above, it can be seen that there must be a successive action connecting the five necessary stops in order to produce a pulse output from point H. For the same reason, there must also be a continuous action completing the five necessary steps in order to produce a pulse output from point I. If someone enters half way and exits, this action will not be counted, in other words, no pulse output will be produced from point H. For the same reason if someone exits half way and returns, his action will not be counted in this circuit; in other words, no pulse output will be produced from point I. With the help of the abovementioned situations, we may fully understand the 6th action as follows:

6. When one enters and A=B=Hi, the output voltage of end Q of IC2 is Hi, and the voltage output of end Q of IC3 is LO. However, if the said person changes his action to exit, then A=Hi, and B=LO, therefore, the voltage output of end Q of IC3 is still at LO level, and no pulse output is produced from end point H. For the same reason, when someone exits and A=Hi, B=Hi, at the time, the voltage outout of end Q of IC8 is at Hi level, and voltage output of end Q of IC9 is at a LO level. However, the said person changes his action and turns back, therefore, A=LO, and B=Hi. Consequently the voltage at end Q of IC9 is still LO, no pulse output is produced from point I, and the counter will not register any change. In conclusion, this invention will not count wrongly when people perform actions between ingress and egress before monitors A5 and A6.

Referring to FIG. 2A, zero-reset-stop base counting circuit A7 comprises IC14 and IC15. When the counted value is not zero, point C is at Hi level and therefore the signals between points I and J are the same. In other words when point I equals Hi, point J also equals Lo, and when point I equals LO, point J also equals LO. It can do normal base counting. When counted value (point) is zero, it converts point C to LO level and locks IC15 up, keeping voltage output at point J at high level. In this way, whether or not there is a pulse signal from point I, it will not make the counter do any counting below base, thus achieving the objective of stop base counting.

Referring to FIG. 2B, manually-operated switch circuit A8 is composed of a manual switch and resistors R13-R16. The first input numeral for J1-J4 of counter IC16 is preset by this manuals switch. Its preset points range from numerals 0–9. Counter circuit A9, as shown in FIG. 2B, is composed of IC16 and IC17. Counter circuit A9, which consists of two counters, which can count digits between high base and low base, using the decimal system for counting; by combining these two counters, the counting points can proceed from 0 to 99, or 99 steps.

Resistors R9 and capacitor C12 contain the function of power on preset, which helps this invention, when plugs on power source, preset the counter (by manual switch A8).

As shown in FIG. 2A, when there is a pulse signal at end UP (point H), the counter will add one. If there are two pulse signals, the counter will add two, and so on. Conversely, if there is a pulse signal at end DOWN (points I-J), the counter will subtract one when there are two pulse signals, the counter will subtract two.

As shown in FIG. 2B, comparator circuit A10 is composed of IC18 and IC19. It is an 8-bit comparative device. Its input end A is coming from output transistors Q1–Q4 of counter circuit A9's IC16 and IC1 7. Its input end B is preset at zero; the comparison is carried out between the counter points and zero point. When both are equal (counted point is zero), then the output of IC9 will rise from LO to Hi, in order to control electricity control drive circuit A11.

As shown in FIG. 2B, electricity control drive circuit A11 is composed of transistors Q5, resistors R11, R2 and an LED. When the counting point is zero, and the output of comparator circuit A10 is Hi, then Q5 is triggered, the voltage level of point C will drop from Hi to LO, and at the same time the LED will illuminate, showing that the counting point is at zero. Electricity control drive circuit A11 of this invention makes use of the change of voltage level at point C to control zero-reset stop base counter circuit A7 and electricity control switch circuit A12. As shown in FIG. 2B, electricity control switch circuit A12 is composed of transistor Q6, solid state relay and resistors R2 and R12. From the above circuit, we observed that when the counted point is not zero, showing that someone is inside the room, voltage at point C is at a high level, transistor Q6 is conductive and cause SSR to act. When nobody is in, the counted point equals zero, and the voltage of point C will drop from Hi to LO, voltage supply to Q6 and SSR are therefore cut, which leads to an automatic cut off of the electricity supply loaded, thus achieving the goal of automatically monitoring electricity control.

In addition, switch S1 has both automatic and manual devices. When it is placed at the normal position (Nor.), through switch S2 manual control can be achieved. In other words, it means to use resistor R2 to supply normal offset voltage to trigger transistor Q6, which then links SSR and keeps the power supply normal.

Referring to the abovementioned description, the characteristics and functions of this invention are classified as follows:

1. This invention, an automatic electricity control device which monitors exit/entry into a room, has a counter, with which by means of its counter circuit can count up to 99 instances of entry and exit.

2. The automatic electricity control monitor device of this invention can be located at any premises or room to control the electricity supply; if nobody is in, it can automatically cut off the power supply there, both for convenience and to save electricity. If people in the house leave, this invention will automatically switch off the power supply only when the last person has passed through its monitor device.

3. The said device of this invention can automatically switch off the power supply when all these people on the premises are out, thus avoiding the risk of wire ignition and shortcircuit owing to over consumption or overloading of power. It therefore provides security.

4. The said device of this invention is equipped with two switches. One has an automatic and a normal switching switch S1, another one in an On-Off switch S2 (see FIG. 2B) of On-Off power control switch circuit A12, under normal function. When S1 is switched to the Auto position, the device can function automotically, so as to provide automatic exit/entry monitoring and electricity control. If S1 is placed at position Nor., the power supply of this device is switched off. Therefore, we have to manually control and switch the position of S2, so as to switch on (position On) or switch off (position Off) electricity control switch circuit A12, in order to achieve manual power control.

5. The said device of this invention is able to prevent wrong detection.

In conclusion, the content and structure revealed herein for this invention are innovative. It has the merits of being convenient and practical to use.

What is claimed is:

1. An apparatus for controlling a power supply line in a building comprising;

entry detection means including an infrared detector for producing detection signals in response to an entry into the building by a human being;

exit detection means including an infrared detector for producing detection signals in response to an exit out of the building by a human being;

counting circuit means for counting and producing signals from the detection signals produced by the entry and exit detection means;

switch means for presetting counting data;

comparator for comparing the signals produced by the counting circuit means and those produced by said means for presetting counting data;

controller circuit emans for receiving the on-off signal and for controlling the power supply line.

2. An apparatus according to claim 1 wherein said infra-red detector of said entry detection means and said exit detection means includes 4 sets of each infra-red light emitters and receiver, having receiver outputs to control resistively biased transistors, in order to detect the order in which people exit and enter.

3. An apparatus according to claim 2 wherein said means for presetting counting data includes a manual switch having different resistive contacts to preset the entry of the first numeral of a counter in said counter circuit means.

4. An apparatus according to claim 1 wherein said infra-red detector of each of said entry detector means and said exit detector means includes two sets of infra-red light emitters and receivers to detect and to discriminate the exit or entry of people by the sequence of signals received on infra-red light receivers.

5. An apparatus according to claim 1, wherein said entry detection means includes a circuit contains integrated circuits to transmit pulse signals to a counter to advance the counter.

6. An apparatus according to claim 1, wherein said exit detection means includes a circuit having integrated circuits to transmit pulse signals to a counter used to reduce the count of the counter.

7. An apparatus according to claim 1 wherein said counting circuit means includes a zero-reset-stop base counting circuit which is composed of two integrated circuits for determining whether the count value of a counter therein reaches zero-reset-stop base, and thereby for establishing whether to decrease the value of counter.

8. An apparatus according to claim 1, wherein said counting circuit means includes integrated circuits to perform adding and subtracting of numerals at or over the base using the decimal system.

9. An apparatus according to claim 1, wherein said comparator circuit means includes two integrated circuits to make a comparison between a preset value established by on input and a counted established a second counted value of input which corresponds to the count value of the counting circuit means.

10. An apparatus according to claim 1, wherein said circuit means for controlling circuit means the power supply line includes a transistor triggered by the output of said comparator circuit to deliver an electrical signal having a voltage level reduced by resistors change of voltage level, to control the zero-reset-stop base of said counting circuit means and a power control switch for controlling the power supply line.

* * * * *